Dec. 16, 1958     T. R. NELSON ET AL     2,864,638
LOCKING DEVICE FOR SPLIT CLAMPING RINGS
Filed June 6, 1955
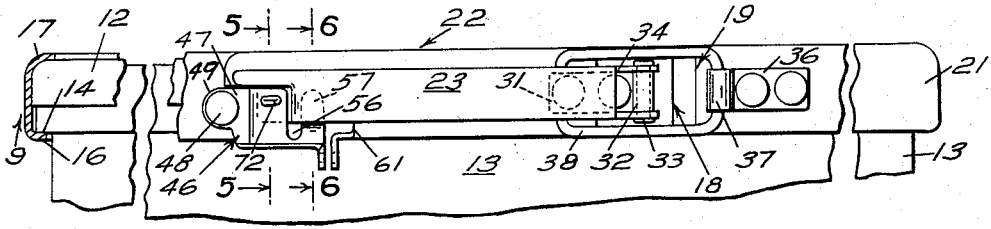
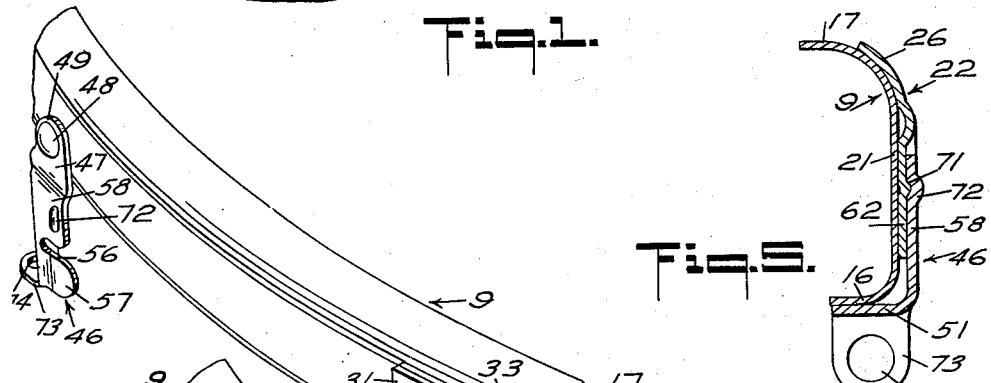
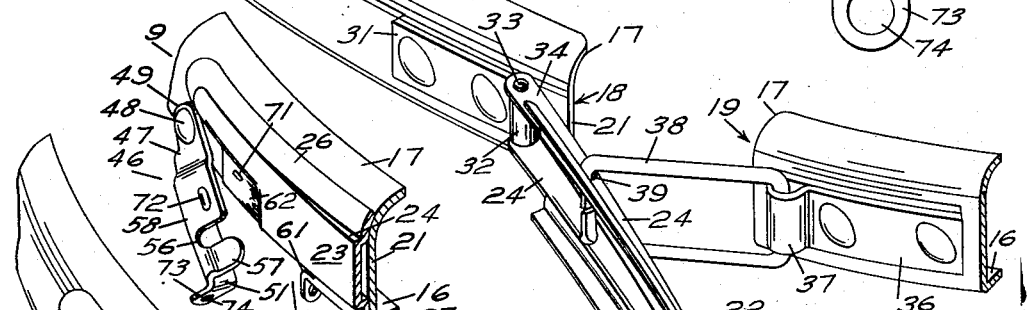
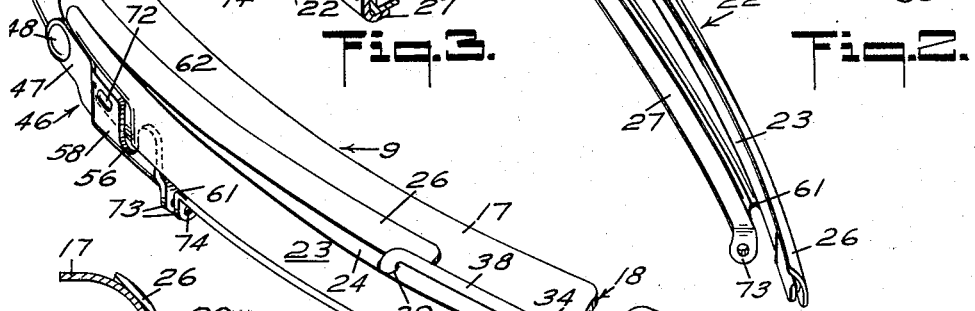
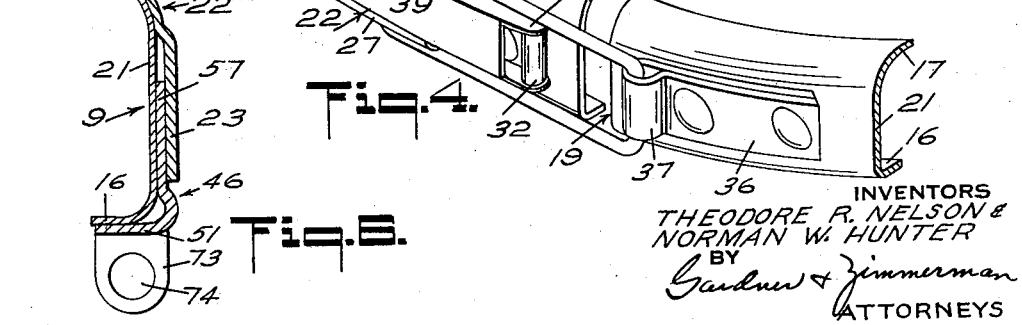
INVENTORS
THEODORE R. NELSON &
NORMAN W. HUNTER
BY
ATTORNEYS

United States Patent Office 2,864,638
Patented Dec. 16, 1958

2,864,638

LOCKING DEVICE FOR SPLIT CLAMPING RINGS

Theodore R. Nelson, Walnut Creek, and Norman W. Hunter, Lafayette, Calif., assignors to Rheem Manufacturing Company, Richmond, Calif., a corporation of California Application June 6, 1955, Serial No. 513,240

6 Claims. (Cl. 292—256.69)

This invention relates to split clamping rings utilized for holding metal closures on containers, and is more particularly directed towards the mechanism for contracting the ring and maintaining the same in closed condition.

Heretofore, a wide variety of devices have been associated with split clamping rings for effecting the foregoing, and many of such devices include a lever mechanism for selectively expanding or contracting the ring so as to permit a removal or securing of the closure and a latch member adapted to lock the lever when the ring is in a contracted or closure-securing position. This general type of device as previously manufactured, has certain shortcomings which frequently interfers with the proper functioning thereof. One of the primary difficulties has resulted from the construction used for the interengagement of the lever and latch, which, while appearing to be satisfactory from a study of the drawings thereof, has experienced trouble in the field. This trouble frequently arises after the clamping ring has been installed and removed on one or more occasions and results in the inability to readily engage and/or disengage the latch and lever. A careful analysis of the prior art devices of the type discussed indicates that the difficulty partly arises from the provision on the lever of a depending tongue adjacent the distal end thereof and a notch inwardly of and adjacent the tongue, leaving an exposed corner on the lever adjacent the notch. The latch is provided with an offset portion forming a socket for receiving the lever tongue and a distal end portion adapted to pass partly in the lever notch and partly beneath or behind the aforesaid corner portion of the lever. This corner not only presents a dangerous projection which may be caught on other surfaces or cause injury to the persons handling the ring, but likewise is extremely susceptible of being deformed. In the event of inward deformation, the latch cannot be moved into locking engagement as the end portion of the latch is prevented from passing behind the same. Conversely, if the corner is bent outwardly, it is ineffective to lock the latch member in place. The same type of criticism is applicable to the depending tongue on the lever, for if this is deformed outwardly or inwardly, it cannot be properly engaged by the offset socket portion on the latch. As will be understood, when the ring is in its expanded position, the lever may be extending radially outwardly from the ring periphery and hence subject to accidental injury resulting in the foregoing types of deformation.

Accordingly, it is an object of the present invention to provide a split clamping ring having a lever for selectively expanding and contracting the ring and a latch member for releasably locking the lever in a closed position, in which the interengaging portions of the latch and lever are constructed so as to permit ready locking and release of the lever at all times notwithstanding normal abuse of the ring assembly.

Another object of this invention is to provide apparatus of the character described in which when the latch is pivoted towards its locking position, a relatively large portion of the latch overlies a portion of the lever urging and holding the lever against its adjacent ring portion, before another portion of the latch passes behind the lever.

A further object of this invention is to provide a clamping ring lock of the above type in which the portion of the lever behind which an end of the latch is adapted to pass is constructed in such a manner so as to withstand continuous hard usage without danger of deformation whereby the latch and lever may repeatedly be brought into positions of longitudinal alignment and maintained in such position.

Yet another object of the invention is to provide apparatus of the type described in which the pivoted latch member is provided with a tongue at its distal end and a notch positioned adjacent thereto, and the lever is provided with an inwardly offset planar portion, whereby a medial portion of the latch may overlie the offset lever portion and the latch tongue may be easily passed behind the lever.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a side elevational view of the upper portion of a container and closure equipped with the split clamping ring and locking arrangement.

Figure 2 is a perspective view of a portion of the split clamping ring and the locking mechanism with the ring shown in its expanded or open position.

Figure 3 is a view similar to Figure 2, but showing the ring in its contracted position but with the lever and latch out of locking engagement.

Figure 4 is a fragmentary view similar to Figure 3, but with the lever and latch in locking engagement.

Figure 5 is a cross-sectional view taken substantially in the plane indicated by line 5—5 of Figure 1.

Figure 6 is a cross-sectional view taken substantially in the plane indicated by line 6—6 of Figure 1.

As hereinabove mentioned, a split clamping ring, such as indicated by the numeral 9, is adapted for releasably holding a cover 12 on a cylindrical container 13. In general, the container will be provided with a radial shoulder 14 adjacent the top thereof and the ring, when placed in operative position, has a lower circumferentially extending flange 16 for engaging such shoulder and a similar upper flange 17 for engaging an upper peripheral portion of the cover. In this manner, when the ring is contracted and the free ends 18 and 19 of the ring brought into adjacent relation, the cover 12 will be securely, though releasably, maintained in a closed condition, flange 16 engaging the container body shoulder, flange 17 engaging the cover, and the ring web 21 embracing the periphery of the cover and a portion of the container.

In order to expand and contract the ring 9, that is, change the ring from its normal expanded position illustrated in Figure 2, to its contracted condition as shown in Figures 3 and 4, a lever 22 is provided and operatively connected to the ring. Lever 22 is preferably integrally formed and includes a central web portion 23, flanges 24 of a maximum depth at one end of the lever and gradually diminishing in depth along the length of the web, and upper and lower curved portions 26 and 27 adapted to be positioned immediately adjacent portions of the ring when the lever as indicated in Figure 3 is in closed position.

One end of the lever 22 is pivotally attached to ring 9 for movement in the general plane of the ring. As here shown, a bracket 31 is mounted on the exterior surface of ring web 21 and includes a tubular element 32. A pin 33 extends through the element 32 and through extensions 34 of the lever flanges, the ends of the pin being peened to prevent its withdrawal. Thus, the lever may be moved between the extreme positions illustrated in the drawing. To interconnect the lever to the other end 19 of the ring, the latter is provided with a bracket 36 having a looped portion 37 for pivotally receiving one end of a toggle link 38, the other ends of the link being journalled in suitable apertures 39 formed in the lever flanges. From the foregoing, it will be understood that movement of the lever to its closed position results in link 38 pulling ring end 19 into adjacent relation to end 18 so as to firmly engage the periphery of the cover 12 and hold the same in place.

When the lever is in its closed position, the web 23 will be slightly spaced from the outer surface of the ring web, not only to lend structural rigidity to the lever and permit attachment of the link, but also to permit reception of the latch member as will be presently explained.

The latch or locking member 46 is mounted for movement in a direction generally normal to the plane of the ring and plane of lever movement, and as above mentioned, the latch includes portions interengageable with portions of the lever for locking the latter in its closed position shown in Figure 3. Latch 46 includes a generally flat body 47 pivotally attached to the ring web by a rivet 48 or the like passing through a planar tab 49 on one end of the body. The body, along one longitudinally extending edge thereof, has a curved portion 51 adapted to be positioned adjacent the ring lower flange 16 when the latch is closed, thereby limiting movement of the latch to a position in general alignment with the ring, irrespective of whether or not the lever is in its closed or open position.

It was previously discussed that the primary purpose of the instant invention was to provide a lever locking arrangement which was easy to operate, which would securely hold the lever in its closed position, and which would properly function under all conditions of reasonably hard wear and tear on the parts of the ring. This is accomplished by placing a notch 56 on the latch body spaced inwardly of the end thereof whereby a tongue 57 is formed on the distal end of the body. A portion 58 of the body inwardly of notch 56 is deformed outwardly from the general plane of the body, such deformation having a generally rectangular configuration and extending for substantially the entire width of the latch body. The latch tongue 57 and offset portion 58 are adapted for locking engagement with portions of the lever presently to be explained.

Returning to the construction of the lever, it will be seen that the lower flange 27 thereof terminates at 61 inwardly of the end of the web. A generally rectangular end portion 62 of the web is offset from the general plane of the web to provide a two sided external pocket, such pocket being arranged to receive latch portion 58 when the latch is pivoted upwardly into locking position. The arrangement of the parts is such that a substantial area of portion 58 will overlie portion 62 before the tongue 57 reaches the lower edge of the lever, thus forcibly urging the lever against the ring. Continued upward rotation of the latch about its pivot 48 results in tongue 57 passing behind the lever web adjacent the offset portion 62 whereby the lever and latch are in alignment with each other and with the band. By virtue of the large overlapping areas of portions 58 and 62, together with the passage of the tongue 57 between the ring and lever, a positive locking is effected. It has also been found that the lever, which in its open position extends outwardly from the ring and therefore subject to possible accidental deformation, does not have any weakening notches or tongues, but has a continuous web. On the other hand, the latch may be positioned in adjacent relation to the ring irrespective of whether the latter is in its expanded or contracted position, and even if left in the position shown in Figure 2, its relatively short length does not particularly lend itself to accidental deformation. Probably the only portion thereof which could be deformed is the tongue 57, and in case of minor deformation, it is still possible to move the latch into its locking position by forcibly urging the tongue behind the lever web.

As further assurance of a good frictional locking engagement, the lever portion 62 is provided with an external dimple 71 which seats in the depression formed by an external dimple 72 on latch portion 58. Also, as is generally conventional with this type of device the ends of the lever and latch are each provided with ears 73 having apertures 74 therethrough for receiving a sealing wire so as to prevent release of the latch without cutting or otherwise breaking the wire.

From the foregoing it will be appreciated that the locking arrangement of our invention is stronger in both construction and effectiveness than prior devices, presents no sharp corners, and may be readily operated with a minimum of difficulty.

What is claimed is:

1. In a split clamping ring having a lever pivotally attached to said ring and movable in the general plane of said ring to expand and contract the ring and a latch member pivoted to said ring and movable in a plane generally normal to said ring plane, said lever having a continuous web portion and flanges along the edges thereof, said web having an inwardly deformed portion adjacent the distal end thereof, said latch having a notch spaced inwardly of the distal end thereof and an outwardly offset portion spaced inwardly of and adjacent said notch, said offset latch portion passing over said inwardly deformed portion of said lever web and the distal end of said latch passing behind an adjacent portion of said lever web when said lever is overlying a portion of said ring and said latch is pivoted into locking engagement therewith.

2. Apparatus as set forth in claim 1 in which said offset latch portion extends for substantially the entire width of said latch, and such portion and said inwardly deformed portion of said lever are each of generally rectangular form.

3. A split clamping ring having a lever pivotally attached thereto and movable in the general plane of said ring to a position immediately adjacent and overlying a peripheral portion of said ring, said lever having a longitudinally extending web portion with the distal end thereof deformed inwardly and towards said ring to provide a two sided pocket, a latch member pivotally attached to said ring adjacent said lever end and movable in a plane normal to the general plane of said ring, said member having a generally planar longitudinally extending body having a tongue at the distal end thereof, a notch adjacent said tongue and an outwardly offset portion adjacent said notch, said latch upon pivotal movement thereof towards said lever having its tongue passing behind said lever web and said offset portion passing into overlapping relation to said deformed end portion of said lever.

4. Apparatus as set forth in claim 3 in which said latch offset portion overlies a substantial area of said lever deformed portion before said latch tongue passes behind said lever web.

5. Apparatus as set forth in claim 3 in which said latch offset portion and said lever deformed portion are each of substantially rectangular configuration and each extending for substantially the entire width of the latch member and lever web respectively.

6. A split clamping ring having a lever pivotally attached thereto and movable in the general plane of said ring to a position immediately adjacent and overlying a peripheral portion of said ring, said lever having a longitudinally extending web portion with the distal end thereof deformed inwardly and towards said ring to provide a two sided pocket, a latch member pivotally attached to said ring adjacent said lever end and movable in a plane normal to the general plane of said ring, said member having a generally planar longitudinally extending body having a tongue at the distal end thereof, a notch adjacent said tongue and an outwardly offset portion adjacent said notch, said latch upon pivotal movement thereof towards said lever having its tongue passing behind said lever web and said offset portion passing into overlapping relation to said deformed end portion of said lever, and a cooperating projection and depression in said lever deformed portion and said latch offset portion for releasably securing said latch and lever.

References Cited in the file of this patent

UNITED STATES PATENTS

| | | |
|---|---|---|
| 2,579,974 | Scott et al. | Dec. 25, 1951 |
| 2,579,975 | Scott et al. | Dec. 25, 1951 |